US010833553B2

(12) United States Patent
Mukai

(10) Patent No.: US 10,833,553 B2
(45) Date of Patent: Nov. 10, 2020

(54) ELECTRIC MOTOR INCLUDING TERMINAL BOX AND MACHINE TOOL

(71) Applicant: FANUC CORPORATION, Yamanashi (JP)

(72) Inventor: Yasuhito Mukai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/191,737

(22) Filed: Nov. 15, 2018

(65) Prior Publication Data
US 2019/0157937 A1 May 23, 2019

(30) Foreign Application Priority Data

Nov. 20, 2017 (JP) ................................ 2017-222642

(51) Int. Cl.
H02K 5/10 (2006.01)
H02K 5/173 (2006.01)
H02K 9/02 (2006.01)
H02K 5/22 (2006.01)

(52) U.S. Cl.
CPC ............ *H02K 5/10* (2013.01); *H02K 5/1737* (2013.01); *H02K 5/225* (2013.01); *H02K 9/02* (2013.01); *H02K 2205/09* (2013.01)

(58) Field of Classification Search
CPC ........ H02K 5/10; H02K 5/1737; H02K 5/225; H02K 9/02; H02K 9/04; H02K 9/06; H02K 2205/09
USPC .......................................................... 310/88
See application file for complete search history.

(56) References Cited

U.S. PATENT DOCUMENTS

2015/0340922 A1* 11/2015 Kamiya ................... H02K 9/02
310/59
2015/0372567 A1* 12/2015 Kamiya ................... H02K 5/10
310/58
2018/0138774 A1* 5/2018 Mukai .................. H02K 5/1732

FOREIGN PATENT DOCUMENTS

DE 4238564 A1 5/1994
JP 2587572 Y2 12/1998
JP 2006353053 A 12/2006
JP 2007105850 A 4/2007

(Continued)

OTHER PUBLICATIONS

English Abstract and Machine Translation for Japanese Publication No. 2006-353053 A, published Dec. 18, 2006, 9 pgs.

(Continued)

*Primary Examiner* — Michael Andrews
(74) *Attorney, Agent, or Firm* — Fredrikson & Byron, P.A.

(57) ABSTRACT

An electric motor including a structure that prevents intrusion of a foreign substance into the electric motor, and a machine tool including the electric motor. A hollow tube that fluidly connects an inner portion of a terminal box and an outer surface of a front flange is provided, and a through hole extending from the outer surface to a front space is formed. The inner portion of the terminal box and the front space communicate with each other through a flow path that is fluidly cut off from an interior space of the machine or other such machine tool and air in the terminal box automatically flows into the front space through the flow path in accordance with rotation of a rotor as described above. Also, the terminal box is fluidly connected with an amplifier provided outside of the machine through an air passage.

6 Claims, 2 Drawing Sheets

(56) References Cited

FOREIGN PATENT DOCUMENTS

| JP | 2013236473 A | 11/2013 |
|---|---|---|
| JP | 5765486 B2 | 8/2015 |
| JP | 2015223022 A | 12/2015 |
| JP | 201610204 A | 1/2016 |
| JP | 2017158240 A | 9/2017 |

OTHER PUBLICATIONS

English Abstract and Machine Translation for Japanese Publication No. 2013-236473 A, published Nov. 21, 2013, 15 pgs.
English Abstract and Machine Translation for Japanese Publication No. 2015-223022 A, published Dec. 10, 2015, 9 pgs.
English Machine Translation for Japanese Publication No. 5765486 B, published Aug. 19, 2015, 41 pgs.
English Abstract and Machine Translation for Japanese Publication No. 2016-010204 A, published Jan. 18, 2016, 16 pgs.
English Machine Translation for Japanese Publication No. 2587572 Y2, published Dec. 16, 1998, 12 pgs.
English Abstract and Machine Translation for Japanese Publication No. 2017-158240 A, published Sep. 7, 2017, 26 pgs.
Untranslated Decision to Grant a Patent mailed by Japan Patent Office (JPO) for Application No. 2017-222642, dated Sep. 3, 2019, 3 pgs.
English Machine Translation of Decision to Grant a Patent mailed by Japan Patent Office (JPO) for Application No. 2017-222642, dated Sep. 3, 2019, 2 pgs.
Untranslated Notice of Reasons for Refusal mailed by Japan Patent Office (JPO) for Application No, 2017-222642, dated Jul. 2, 2019, 4 pgs.
English Machine Translation of Notice of Reasons for Refusal mailed by Japan Patent Office (JPO) for Application No. 2017-222642, dated Jul. 2, 2019, 4 pgs.
English Abstract and Machine Translation for German Publication No. 4238564 A1, published May 19, 1994, 7 pgs.
English Abstract and Machine Translation for Japanese Publication No. 2007-105850 A, published Apr. 26, 2007, 24 pgs.

* cited by examiner

US 10,833,553 B2

ELECTRIC MOTOR INCLUDING TERMINAL BOX AND MACHINE TOOL

BACKGROUND OF THE INVENTION

1. Field of the Invention

The present invention relates to an electric motor including a terminal box and a machine tool including the electric motor.

2. Description of the Related Art

Some electric motors (rotating motors) including a stator and a rotor have a structure to prevent intrusion of water or a foreign substance into the electric motor. In this connection, a technique of increasing an internal pressure of the electric motor by using an air purging structure (air supply device) or forcibly generating an air flow to prevent intrusion of a foreign substance is known (e.g., see JP 2013-236473 A, JP 5765486 B, and JP 2015-223022 A).

On the other hand, a technique intended to prevent intrusion of water, etc., into the electric motor by using flowing air generated by rotation of a rotor is also known (e.g., see JP 2006-353053 A).

In a case where the air purging structure is used, a separate air supply device, etc., is required and consequently the total cost of a machine including the electric motor is increased. On the other hand, in a case where no air supply device is used, it is difficult to establish a flow path structure capable of reliably preventing intrusion of a foreign substance into the electric motor. In addition, such a flow path structure may be complicated, resulting in an increased cost of the electric motor.

SUMMARY OF THE INVENTION

One aspect of the present disclosure provides an electric motor including a stator, a rotor including a rotating shaft rotatable about an axis with respect to the stator, a bearing configured to rotatably support the rotating shaft, a housing configured to support the bearing and also define a space adjacent to the bearing on an outer side in a direction of the axis, and a terminal box for a power line connected to the electric motor, wherein an inner portion of the terminal box and the space communicate with each other through a flow path provided on an outer side of the stator, and air in the terminal box automatically flows into the space through the flow path in accordance with a rotation of the rotor.

Another aspect of the present invention provides a machine tool including the electric motor according to the above-described aspect, wherein the electric motor is provided inside the machine tool and the terminal box is fluidly connected with an outer portion of the machine tool.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
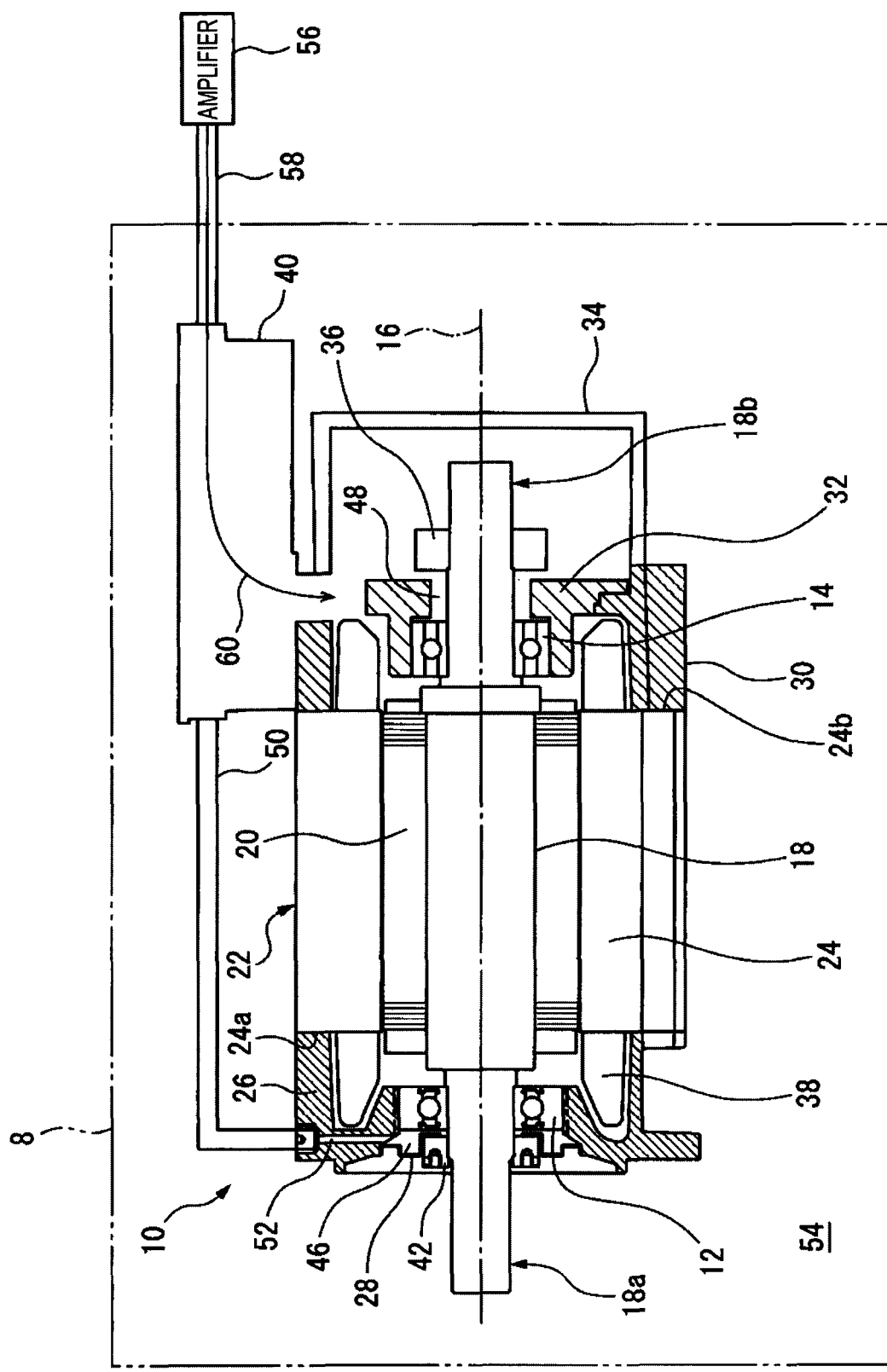
FIG. 1 illustrates a schematic structure of an electric motor according to a preferred embodiment.
Figure 2:
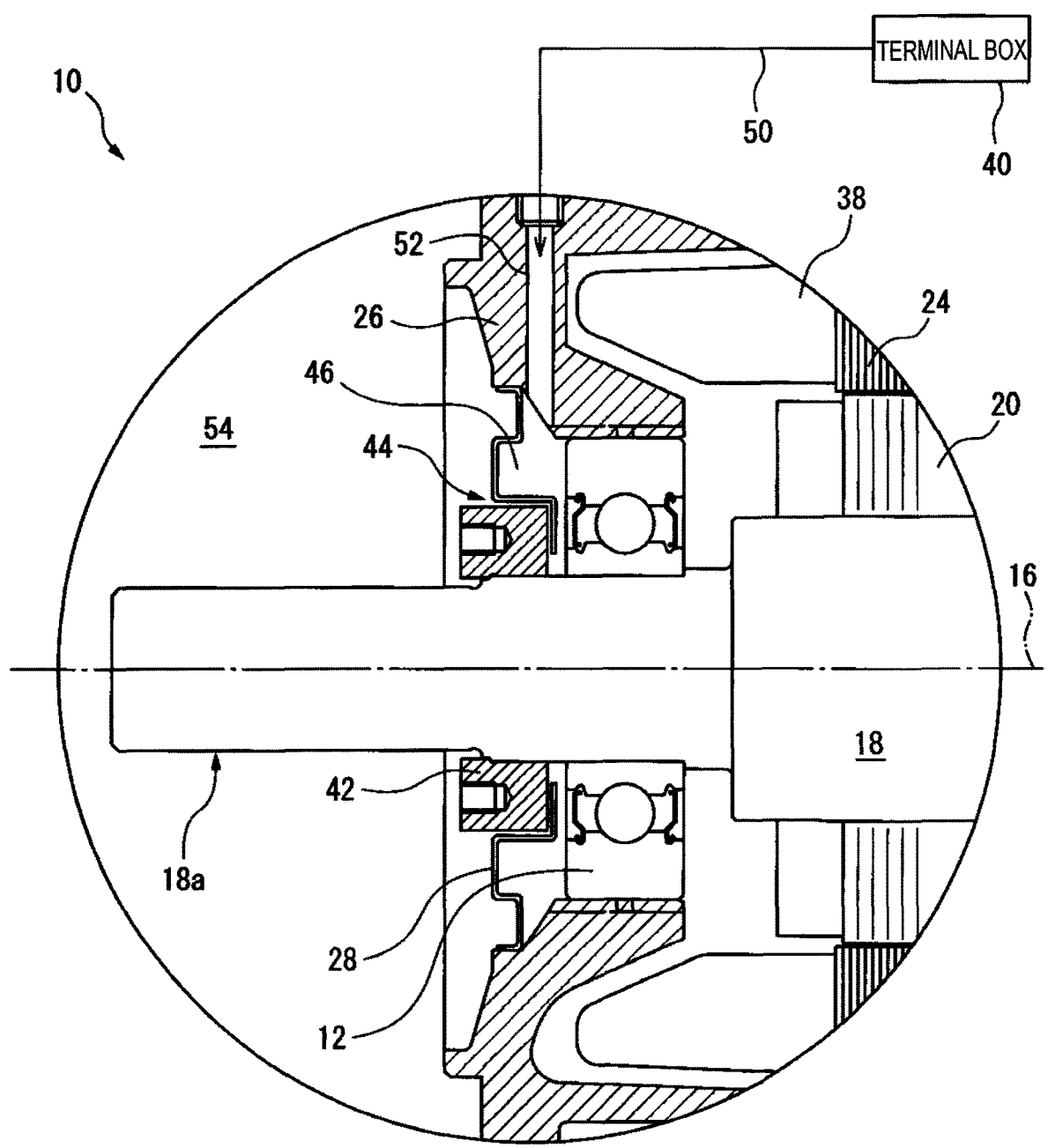
FIG. 2 is a partially enlarged view of the vicinity of an output shaft of the electric motor in FIG. 1.

FIG. 1 is a cross-sectional view in an axial direction illustrating a schematic structure of an electric motor (rotating motor) 10 according to a preferred embodiment, and FIG. 2 is a partially enlarged view of a front part (near an output shaft) of the electric motor 10. The electric motor 10 is disposed in an inner portion of a machine 8, which is schematically illustrated, such as a machine tool and includes a rotating shaft 18 rotatably supported about an axis 16 by a first bearing (front bearing) 12 and a second bearing (rear bearing) 14, a rotor 20 rotating integrally with the rotating shaft 18 while fit to an outer circumferential surface of the rotating shaft 18, and a stator 22 of a substantially cylindrical shape extending along the axis 16 to surround the rotor 20. Note that the inner portion of the machine 8 means a space with a poorer air environment (with a higher degree of contamination) than an outer portion of the machine, such as a processing chamber of the machine tool. Specifically, it refers to a space including air with a mist of cutting fluid, and the like dispersed therein, which should not enter the inner portion of the electric motor. On the other hand, the outer portion of the machine 8 means a space with cleaner air than the inner portion of the machine 8. Even when outside air of the machine 8 enters the inner portion of the electric motor, a problem such as a malfunction of the electric motor does not occur.

The front bearing 12 is provided near a front end 18a of the rotating shaft 18 and supported by a front flange 26 fixed by screwing or the like to a front end face 24a of a core (stator core) 24 of the stator 22. The front flange 26 extends from the front end face 24a of the stator core 24 toward the front end 18a of the rotating shaft 18 and supports a part of the rotating shaft 18 and the front bearing 12 (an outer race thereof). Also, a front cover 28 having a substantially annular shape is attached to the front flange 26. The front end 18a of the rotating shaft 18 protrudes from the front flange 26 and the front cover 28, and the rotating shaft 18 functions as an output shaft directly or indirectly connected to a spindle of the machine tool such as a lathe or a machining center, for example.

Note that in the present specification, the output shaft side (left side in FIG. 1) and the opposite side thereof (right side in FIG. 1) are respectively referred to as "front" and "rear", for convenience. In addition, the "axis direction" or "axial direction" refers to a direction parallel to the rotational axis 16.

The rear bearing 14 is provided near a rear end 18b of the rotating shaft 18 opposing the front end 18a of the rotating shaft 18. A rear flange 30 is fixed by screwing, etc., to a rear end face 24b of the stator core 24, and a support ring 32 is fixed by screwing, etc., to the rear flange 30 and supports the rear bearing 14 (an outer race thereof). The rear end 18b of the rotating shaft 18 protruding from the rear flange 30 is surrounded by a rear cover 34 attached to the rear flange 30. Also, an encoder 36 detecting a rotational position and a rotation speed, etc., of the rotating shaft 18 is attached to the rear end 18b of the rotating shaft 18.

The stator 22 includes the stator core 24 including a plurality of electromagnetic steel sheets that are laminated and a coil 38 wound around a protrusion (not illustrated) on an inner circumferential surface of the stator core 24. The coil 38 is fixed to the stator core 24 by a resin, etc. The coil 38 extends protruding from both ends of the stator core 24 along the rotational axis 16, and is connected to a power line (lead wire) (not illustrated) led out of a terminal box 40. The coil 38 generates a rotating magnetic field by using a current supplied through the power line, and the rotor 20 is rotated integrally with the rotating shaft 18 by the generated rotating magnetic field.

Here, the electric motor 10 may be connected to the spindle of the machine tool and may be used in an environment (e.g., inside the processing chamber of the machine tool) in which a solid such as dust or a liquid such as a cleaning liquid or a cutting liquid (hereinafter simply referred to as a "foreign substance") is dispersed. When such foreign substances enter the inner portion of the electric motor, the coil may be poorly insulated or supporting of the bearing may be impaired. Thus, it is desired to more reliably prevent intrusion of a foreign substance.

Providing a labyrinth structure near at least one of the front bearing 12 or the rear bearing 14 (in the illustrated example, the front bearing 12) is known as means for preventing intrusion of a foreign substance. Specifically, a labyrinth member 42 that is substantially ring shaped is fixed by interference fitting, etc., to a portion (outer circumferential surface) of the rotating shaft 18 anterior to the front bearing 12 as seen in the axis 16 direction (outside of the electric motor), and the labyrinth member 42 is configured to rotate integrally with the rotating shaft 18. Also, a gap 44 is formed between the front cover 28 and the labyrinth member 42 to keep them from contacting each other. Thus, in the present embodiment, a front space 46 including the gap (flow path) 44 adjacent to the front bearing 12 and communicating with the outer portion of the electric motor is defined by the front housing configured by the front flange 26 and the front cover 28, the front bearing 12, and the labyrinth 42 on the outer (anterior) side with respect to the front bearing 12 as seen in the axial direction. Note that when the electric motor 10 includes no labyrinth structure, the front housing and the front bearing 12 define the front space including the flow path (gap between the front cover 28 and the rotating shaft 18).

Likewise, in a case where the labyrinth structure is provided near the rear bearing 14, the labyrinth member 42 that is substantially ring shaped is provided in a portion (outer circumferential surface) of the rotating shaft 18 posterior to the rear bearing 14 as seen from the axis 16. Also in the rear bearing 14, in a similar manner to that of the front space 46, a rear space 48 including a gap (flow path) adjacent to the rear bearing 14 and communicating with the outer portion of the electric motor can be defined on the outer (posterior) side with respect to the rear bearing 14 as seen in the axial direction. More specifically, the rear housing is configured by the support ring 32 and the rear cover 34, and the rear housing and the rear bearing 14 define the rear space 48 including a gap (flow path) communicating with the outer portion of the electric motor.

Here, there are cases where the above-described labyrinth structure alone cannot sufficiently and reliably prevent intrusion of a foreign substance. For example, when the labyrinth 42 rotates with the rotating shaft 18, a phenomenon occurs where negative pressure is formed around the labyrinth 42 and air in an inner portion of the electric motor is sucked to the outside (from Bernoulli's theorem). More specifically, an air flow is generated flowing to the outside through the gap 44 between the labyrinth 42 and the front cover 28 from the front space 46, whereby an internal pressure of the electric motor becomes lower (negative) than an external pressure.

During the rotating shaft 18 (labyrinth 42) is rotating at a constant speed, the inner portion of the electric motor is kept under a negative pressure, but once the labyrinth stops rotating, a stream of air is generated flowing from the gap 44 into the front space 46 to counteract the negative pressure. At this time, the vicinity of the labyrinth 42 is filled with air containing a high content of foreign substance and therefore, the foreign substance enters the inner portion of the electric motor.

To overcome this, in the present embodiment, as illustrated in FIG. 1 or 2, the inner portion of the terminal box 40 and the front space 46 are made to communicate with each other through a flow path provided on an outer side of the stator 22 so that air inside of the terminal box 40 automatically flows into the front space 46 through the flow path in accordance with the rotation of the rotor 20. More specifically, a hollow tube 50 such as a flexible tube or a rigid tube, which fluidly connects the inner portion of the terminal box 40 and an outer surface (here, an outer circumferential surface) of the front flange 26, is provided extending radially outside the stator 22. On the other hand, a through hole 52 is formed extending from the outer surface of the front flange 26 to the front space 46, and the hollow tube 50 and the through hole 52 constitute a flow path outside of the stator 22. In this way, the inner portion of the terminal box 40 and the front space 46 communicate with each other through a flow path that is fluidly cut off from an interior space 54 of the machine 8 such as a machine tool. Also, the electric motor 10 is not provided with a communication hole extending from the vicinity of the front bearing 12 to the inner portion (space with the rotor 20 and the coil 38) of the electric motor.

On the other hand, the inner portion of the terminal box 40 is fluidly connected with the outer portion (clean environment) of the machine 8, and in the example in FIG. 1, the terminal box 40 is fluidly connected with an amplifier 56 provided outside the machine 8 through a hollow air passage 58 such as a flexible tube or a rigid tube. The air passage 58 can also function as a conduit leading a power line or cable 60 from the amplifier 56 into the terminal box.

The terminal box 40 itself generally has a sealed structure and thus includes no opening or the like that opens toward the interior space 54 of the machine 8. On the other hand, the amplifier 56 generally has no sealed structure and thus, the inner portion of the amplifier 56 is filled with air of substantially similar cleanliness as that of the outer portion (clean environment) of the machine 8. Hence, when the rotating shaft 18 rotates, clean air in the amplifier 56 automatically flows into the front space 46 through the air passage 58, the terminal box 40, the tube 50, and the through hole 52 so as to compensate for the air flowing out from the gap 44. Hence, in the present embodiment, clean air can be supplied into the front space 46 without using an air purging device, etc., by utilizing an air stream generated by the rotation of the rotating shaft 18.

As described above, since a certain amount of air flows from the terminal box 40 into the front space 46, negative pressure relative to the outer portion of the electric motor is not formed inside the front space 46. Accordingly, since contaminated air does not flow into the front space 46 from the gap 44 at the moment when the rotating shaft 18 is stopped, the intrusion of a foreign substance into the inner portion of the electric motor is prevented and the inner portion of the electric motor is kept clean. A similar structure can be provided in the above-described rear space as well.

In this way, the electric motor (rotating motor) 10 according to the present embodiment can automatically supply air into the front space 46 by utilizing an air stream generated by the rotation of the rotating shaft 18 in addition to the function generally provided in the labyrinth 42 of preventing intrusion of a foreign substance. In this connection, only clean air in the terminal box 40 can be supplied into the front space 46. Hence, an air purging device, etc., is not separately required and thus, a manufacturing cost of the electric motor can be reduced. Moreover, when such an electric motor is applied to a machine tool such as an NC lathe or a machining center including a spindle capable of high-speed rotation (i.e., higher degree of air contamination inside a processing chamber), a high safety and low cost machine tool can be obtained.

As a preferred modified example, instead of providing the hollow tube 50 such as a tube or a pipe, the terminal box 40 may be directly connected to the front flange 26 (the through hole 52 formed therein). Also, in the example in FIG. 1, the amplifier 56 is illustrated as an example of a constituent component outside of the machine 8, which is connected to the terminal box 40 (for supplying clean air to the terminal box 40), but any other constituent component can be used instead. Note that the amplifier is generally provided in the electric motor and thus, the use of the air passage 58 (generally, the conduit doubles as the air passage) from the amplifier 56 eliminates the need to use another constituent component.

In the present disclosure, clean air can automatically flow into the electric motor without intentionally (forcibly) supplying air into the electric motor by using an air purging device or the like. More specifically, even when a negative pressure is momentarily formed inside the electric motor in accordance with the rotation of the rotor, clean air in the terminal box automatically flows into the electric motor to counteract the negative pressure. Here, since the inner portion of the terminal box does not communicate with the inner portion of the machine tool and only communicates with the outer portion (clean environment) of the machine tool, contaminated air in the machine tool does not flow into the electric motor. Also, since a certain amount of (clean) air flows into the electric motor all the time when the rotor is rotating, when the rotor stops rotating, air (air in the machine tool) does not enter from the vicinity of the labyrinth because of a negative pressure, unlike the related art. This makes it unnecessary to provide an air purging device to increase an internal pressure of the electric motor and makes it possible to reduce the cost of the electric motor and of a machine (e.g., machine tool) including the electric motor.

According to the present disclosure, clean air in the terminal box automatically flows into the electric motor in accordance with the rotation of the rotor, whereby contaminated air or a foreign substance can be effectively prevented from entering the inner portion of the electric motor without using an air purging device, etc.

While the invention has been described with reference to specific embodiments, it will be understood, by those skilled in the art, that various changes or modifications may be made thereto without departing from the scope of the following claims.

The invention claimed is:

1. An electric motor comprising:
    a stator;
    a rotor including a rotating shaft rotatable about an axis with respect to the stator;
    a bearing configured to rotatably support the rotating shaft;
    a housing configured to support the bearing and define a space adjacent to the bearing on an outer side in a direction of the axis; and
    a terminal box for a power line connected to the electric motor,
    wherein an inner portion of the terminal box is in fluid communication with a clean environment, the inner portion of the terminal box and the space communicate with each other through a hollow tube provided on an outer side of the stator, and air in the clean environment automatically flows into the space through the inner portion of the terminal box and the hollow tube in accordance with a rotation of the rotor so that air, flowing out from a gap that is adjacent to the bearing and communicated with an outer portion of the electric motor, is compensated;
    wherein an element other than the hollow tube does not intervene between the terminal box and the space defined by the housing.

2. The electric motor of claim 1, wherein the electric motor includes a labyrinth member attached to a portion of the rotating shaft positioned on an outer side of the bearing in the direction of the axis and configured to define a part of the space, and the gap is defined between the bearing and the labyrinth member.

3. The electric motor of claim 1, wherein the terminal box is connected to an air passage that doubles as a conduit for the power line.

4. The electric motor of claim 1, wherein the terminal box is connected to a through hole formed in the housing, through the hollow tube extending outside of the stator.

5. A machine tool comprising the electric motor of claim 1, wherein the electric motor is provided inside the machine tool and the terminal box is fluidly connected with an outer portion of the machine tool.

6. An electric motor comprising:
    a stator;
    a rotor including a rotating shaft rotatable about an axis with respect to the stator;
    a bearing configured to rotatably support the rotating shaft;
    a housing configured to support the bearing and define a space adjacent to the bearing on an outer side in a direction of the axis; and
    a terminal box for a power line connected to the electric motor,
    wherein an inner portion of the terminal box is in fluid communication with a clean environment, the inner portion of the terminal box and the space communicate with each other through a hollow tube provided on an outer side of the stator, and air in the clean environment automatically flows into the space through the inner portion of the terminal box and the hollow tube in accordance with a rotation of the rotor so that air, flowing out from a gap that is adjacent to the bearing and communicated with an outer portion of the electric motor, is compensated;
    wherein the electric motor includes a labyrinth member attached to a portion of the rotating shaft positioned on an outer side of the bearing in the direction of the axis and configured to define a part of the space, and the gap is defined between the bearing and the labyrinth member.

* * * * *